Figure 1:
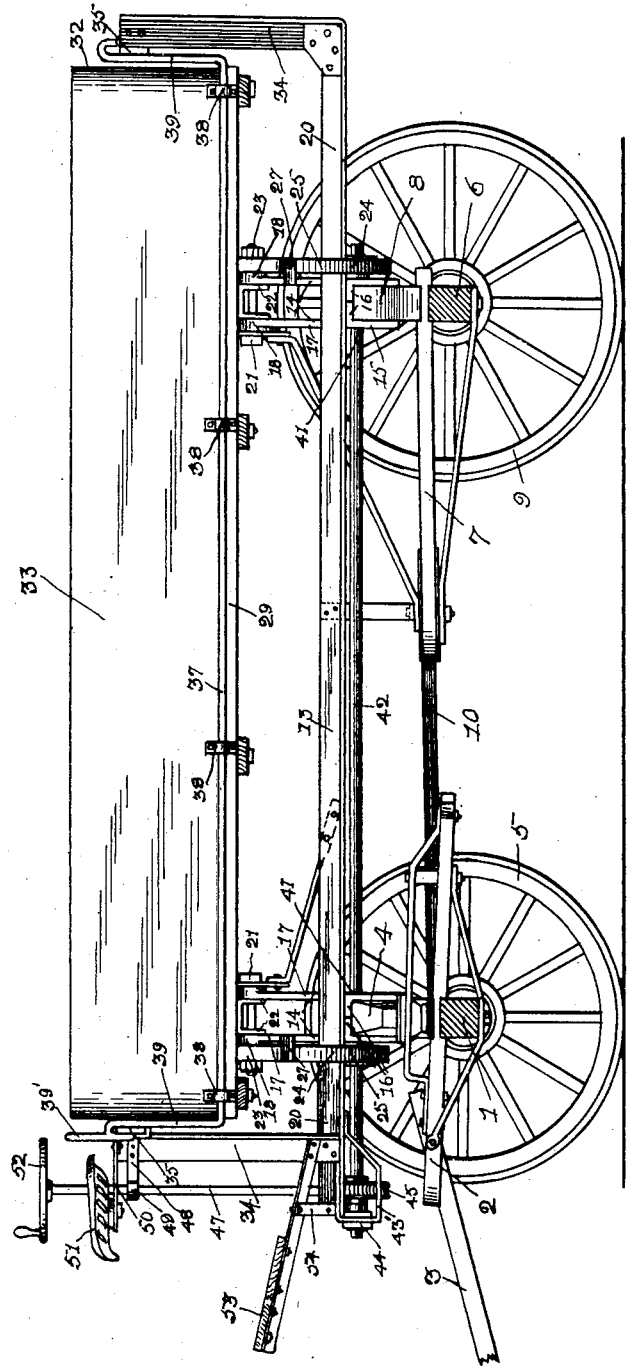

E. LEDFORD.
DUMP WAGON.
APPLICATION FILED JULY 7, 1910.

980,976.

Patented Jan. 10, 1911.
2 SHEETS—SHEET 1.

WITNESSES:
D. C. Watter
M. S. Smith

INVENTOR.
Edward Ledford
by Robt. B. Wilson
Attorney

E. LEDFORD.
DUMP WAGON.
APPLICATION FILED JULY 7, 1910.

980,976.

Patented Jan. 10, 1911.
2 SHEETS—SHEET 2.

WITNESSES:
D. C. Walter
M. S. Smith

INVENTOR.
Edward Ledford
by Robt. B. Wilson
Attorney

UNITED STATES PATENT OFFICE.

EDWARD LEDFORD, OF TOLEDO, OHIO, ASSIGNOR OF ONE-THIRD TO HENRY SAUTER AND ONE-THIRD TO WILLIAM JOHN GRAY, BOTH OF TOLEDO, OHIO.

DUMP-WAGON.

980,976.          Specification of Letters Patent.      Patented Jan. 10, 1911.

Application filed July 7, 1910. Serial No. 570,747.

*To all whom it may concern:*

Be it known that I, EDWARD LEDFORD, a citizen of the United States, residing at Toledo, in the county of Lucas and State of Ohio, have invented a new and useful Improvement in Dump-Wagons, of which the following is a specification.

My invention relates to a dump wagon, and has for its object to provide a light running vehicle of the kind, that is convenient for loading, and that is adapted to quickly dump a load on either side as desired.

I accomplish these objects by the construction and combination of parts as herein-after described and illustrated in the drawings, in which—

Figure 2:
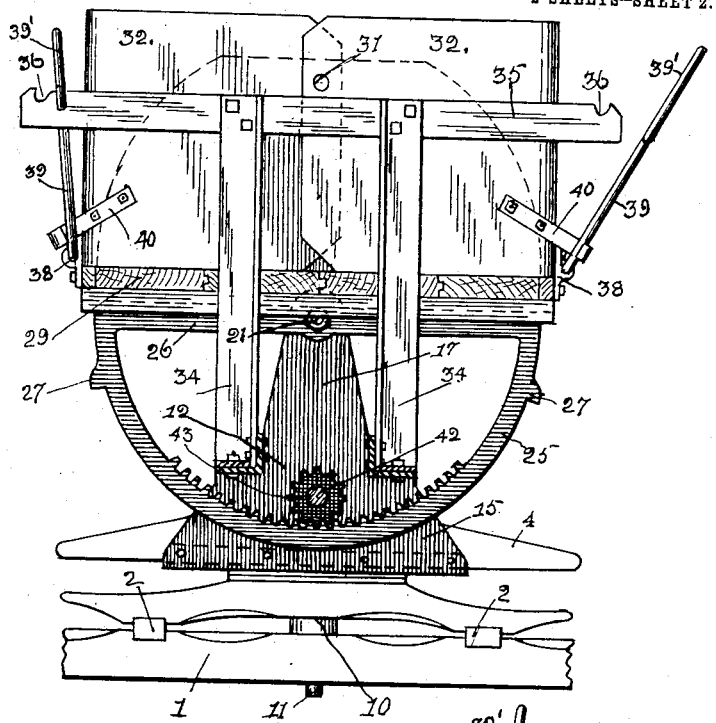
Figure 3:
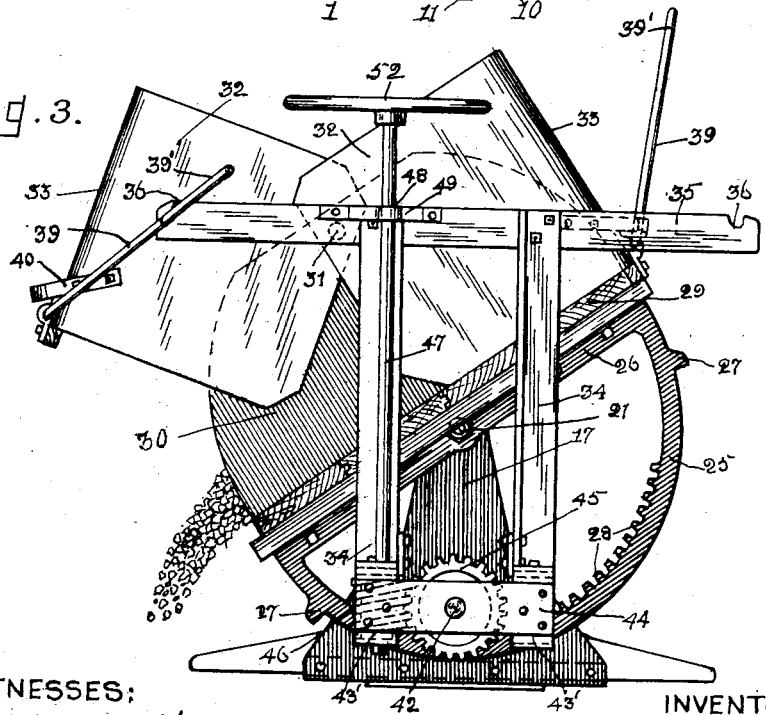

Figure 1 is a view partly in section and partly in side elevation, of a dump wagon constructed in accordance with my invention. Fig. 2 is an enlarged front end view of the same, with the seat, dumping wheel, gear, and foot rest removed, and the stringers of the bed support and the dumping shaft cross sectioned flush with the front edges of the front struts of the support, and with the front axle shown broken away. Fig. 3 is a front end elevation of the dump bed and its supporting frame, the bed and its rockers being shown in position dumping the load.

In constructing my dump wagon I preferably use the running gear of the road or farm wagon commonly used, comprising the front axle 1, having the forehounds 2, the tongue 3, the pivoted front bolster 4, the front wheels 5, the rear axle 6 having the hind hounds 7, the fixed bolster 8 and the rear wheels 9, the reach pole 10, and the king bolt 11 pivotally connecting the front axle to the front bolster and the reach 10.

Upon the front bolster 4 and rear bolster 8 is mounted a rocker bed support comprising the pedestals 12 and the stringers 13, secured to and supported by the pedestals. The pedestals 12 are preferably formed of a pair of complementary plates 14, having broad base portions 15 provided with flanges 16, and central standard portions 17, having the bearings 18 at their top ends. A pair of the plates 14 are jointly secured to opposite sides of each bolster with the flanges 16 resting on the top of the bolster by bolts extending through the plates and the bolster.

On each side of the standard portions 17 the bases of the plates are provided with ledges which are at right angles to side portions of the standard, and upon the ledges are mounted and secured the angle bar stringers 13, which have end portions 20 extending beyond the pedestals.

In the bearings 18 of each pedestal 12 is a bolt 21 upon which is centrally and pivotally mounted the channel bar bed bolsters 22, and on the outer end portion of each bolt 21 is also mounted by the central bearing 23 a rocker segment 24, comprising the semi-circular rim 25 and the diametric portion 26. Each rim 25 is provided on its outer circumference with the stop lugs 27 at equal distances from the diametric portion 26, and on the inner face is provided through 90° with gear teeth 28.

Upon the bolsters 22 and the diametric portions of the rocker segments 24 is mounted and secured the bottom 29 of a wagon bed, end portions of which extend over the end portions 20 of the stringer bars 13 and upon each end portion of the bottom 29 is fixedly secured end plates 30, to which are hinged by bolts 31 the angled end portions 32 of the sides 33 of the bed. Near each end of the bed there is mounted and secured to the end portions 20 of the stringers 13 a pair of struts 34 to the top ends of which are secured the bars 35, parallel with the ends of the bed, and near the ends of the bars in their upper edges are provided incuts 36. The sides 33 of the bed along their lower outside faces are each provided with a rod 37, which extends from end to end of the sides and is rotatably secured thereto by the hinge straps 38 secured at intervals to the sides. The rods 37 have end portions bent at right angles from the main body of the rod and formed as hooks 39 which extend upward and over the bars 35, and are limited in their movement inward by engaging the bars, and outward past the ends of the bars by a strap 40 secured to the end of the bed and having a hook portion extending across the path of movement of the hook 39. The hooks 39 at the front end of the bed are each provided with a handle extension 39'.

In the pedestals 12 above the bolsters 4 and 8 are provided alined orifices 41 in which is journaled a shaft 42 that has end portions extending through the rocker segments 24, and on the extensions are fixedly mounted the pinions 43 which intermesh with the teeth of the segments.

To the front ends of the stringers 13 are secured the stirrups 43', to which is secured the bearing plate 44 in which is journaled the front end of the shaft 42, and adjacent to the bearing plate there is mounted on the shaft a worm gear wheel 45 which intermeshes with a worm 46 mounted on a vertical shaft 47, journaled in the bearings 48 of a bracket 49, secured to one of the struts 34 at the front end of the bed, and to the companion strut is secured a bracket 50 which supports a driver's seat 51 and upon the upper end of the worm shaft 47 near the driver's seat is mounted a crank wheel 52 whereby the driver of the wagon may operate the worm. A foot rest 53 for the driver is secured to the struts 34, and supported above the front end portions 20 of the stringers 13 by the struts 54 secured to the front ends of the stringers.

Thus constructed, when the crank wheel is revolved in one direction the shaft 42 is revolved in the opposite direction, thereby turning the rocker segments on the bolts 21 as their centers in the same direction as the shaft until the stop lugs 27 that are approaching the pedestals 12 engage the pedestals and limit further movement in that direction. The turning of the segment raises one side of the bed and lowers the opposite side, as shown in Fig. 3. If it is desired to place the bed in a convenient position to load, (with earth for instance), the hooks 39 on the side that is to be lowered are pushed outward free from the bars 35 in the positions shown in Fig. 2 on the right. The hooks 39 of the side 33 that is lowered being in the position described, the side will remain in its normal position resting on the bottom of the bed and when lowered the full distance permitted by the stops 27 on the same side of the segments 24, the top of the side is so lowered that the labor of shoveling earth or other material into the bed over it is greatly reduced. When half or more of the capacity of the bed has been filled in, by moving the hooks 39 of the opposite side outward, the position of the bed may be reversed and the remainder of the load filled in from the other side. When loaded and the bed has been moved into its normal horizontal position by the wheel 52, the wagon may be hauled to the place of dumping, and there dump the load to either side, as desired, by first bringing the hooks 39 of the sides over the bars 35 and then tilting the bed toward the side on which the load is to be dumped by turning the wheel 52. As the bed is tilted by the segments the hooks 39 of the side 33 toward which the bed is tilted engages the notches 36 of the bars 35 and holds the side 33 in its normal position while the bottom 29 moves away from the side, thereby releasing the load, which slides down the inclined bottom to the ground. It is manifest that all of the positions of the bed either for loading or for dumping the load may be quickly and conveniently effected by the driver without leaving the seat.

By my construction the load is nearly equally carried by the front and rear wheels, and the horses being hitched to the wagon nearer the load, the wagon is made easier to pull as is well understood. It will be seen also that by raising and turning either side 33 over onto the opposite side, the bed in its normal horizontal position is made convenient for loading heavy articles into it and unloading them from it, without the necessity of raising them over the sides.

What I claim to be new is—

1. The combination with the bolsters of a wagon running gear, of a bed supporting frame mounted on the bolsters, comprising a pair of pedestals, one mounted on each bolster and having top bearings, parallel stringers mounted on and secured to the bases of the pedestals, a pair of semi-circular rocker segments, one axially journaled in the bearings of each pedestal, a bed mounted on and secured to the diametric portion of the segment, said bed comprising a bottom, end plates secured to the end portions of the bottom, and sides having angled end portions hinged to the end plates, dumping bars supported on the stringers adjacent to the ends of the bed, supports attached to the sides of the bed, and adapted to be engaged with or disengaged from the dumping bars, and means to rotate the segments through an arc in either direction.

2. The combination with the bolsters of a wagon running gear, of a bed supporting frame mounted on the bolsters, comprising a pair of pedestals, one mounted on each bolster and having top bearings, parallel stringers mounted on and secured to the bases of the pedestals, a pair of toothed semi-circular rocker segments, one axially journaled in the bearings of each pedestal, a bed mounted on and secured to the diametric portions of the segments, said bed comprising a bottom, end plates secured to the end portions of the bottom, and sides having angled end portions hinged to the end plates, dumping bars supported on the stringers adjacent to the ends of the bed, supports attached to the sides of the bed, and adapted to be engaged with or disengaged from the dumping bars, means to rotate the segments through an arc in either direction, comprising a shaft journaled in the bases of the pedestals, pinions mounted on the shaft and intermeshing with the teeth of the segments, a worm gear mounted on the shaft, and a shaft provided with a hand crank, and with a worm intermeshing with the worm gear.

3. The combination with the bolsters of a wagon running gear, of a bed supporting frame mounted on the bolsters, comprising a pair of pedestals, one mounted on each bolster and having top bearings, parallel stringers mounted on and secured to the bases of the pedestals, a pair of semi-circular rocker segments, one axially journaled in the bearings of each pedestal, a bed mounted on and secured to the diametric portions of the segments, said bed comprising a bottom, end plates secured to the end portions of the bottom, and sides having angled end portions hinged to the end plates, dumping bars supported on the stringers adjacent to the ends of the bed, rocker rods hinged to the sides of the bed and having hook arms adapted to be engaged with or disengaged from the dumping bars, and means to rotate the segments through an arc in either direction.

4. The combination with the bolsters of a wagon running gear, of a bed supporting frame mounted on the bolsters, comprising a pair of bifurcated pedestals, one mounted on each bolster and having alined top bearings, parallel angle bar stringers, bolts in the bearings of the pedestals, rocker bolsters centrally pivoted on the bolts between the bifurcations of the pedestals, a pair of toothed semi-circular rocker segments axially journaled on the bearing bolts, a bed mounted on the tops of the bed bolsters and rocker segments, said bed comprising a bottom, end plates secured to end portions of the bottom, and sides having angled end portions hinged to the end plates, dumping bars supported on the stringers adjacent to the ends of the bed, supports attached to the sides of the bed, and adapted to be engaged with or disengaged from the dumping bars, and means to rotate the segments through an arc in either direction.

In witness whereof I have hereunto signed my name in the presence of two subscribing witnesses, this 12th day of June, 1910.

EDWARD LEDFORD.

In presence of—
W. J. BILLINGSLEA,
M. S. SMITH.